(12) United States Patent  
Furutani et al.

(10) Patent No.: US 11,808,202 B2
(45) Date of Patent: Nov. 7, 2023

(54) ENGINE CRANK PULLEY STRUCTURE

(71) Applicant: Mazda Motor Corporation, Hiroshima (JP)

(72) Inventors: Masayuki Furutani, Aki-gun (JP); Koichi Hirata, Aki-gun (JP); Satoshi Nishizaka, Aki-gun (JP); Kazuhiro Tokushima, Aki-gun (JP); Yuzo Fujino, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 146 days.

(21) Appl. No.: 17/595,525

(22) PCT Filed: Feb. 21, 2020

(86) PCT No.: PCT/JP2020/007118
§ 371 (c)(1),
(2) Date: Nov. 18, 2021

(87) PCT Pub. No.: WO2020/246078
PCT Pub. Date: Dec. 10, 2020

(65) Prior Publication Data
US 2022/0316392 A1 Oct. 6, 2022

(30) Foreign Application Priority Data
Jun. 3, 2019 (JP) .................................. 2019-103785

(51) Int. Cl.
*F02B 67/06* (2006.01)
*F16H 55/36* (2006.01)
*F16H 7/08* (2006.01)

(52) U.S. Cl.
CPC ............. *F02B 67/06* (2013.01); *F16H 55/36* (2013.01); *F16H 2007/0865* (2013.01)

(58) Field of Classification Search
CPC ... F16H 2007/0865; F16H 55/36; F02B 67/06
See application file for complete search history.

(56) References Cited

U.S. PATENT DOCUMENTS 4,781,659 A * 11/1988 Gebhardt .................. F16D 3/76
474/903

FOREIGN PATENT DOCUMENTS

| JP | 34811519 U | 2/1973 |
| JP | 35787862 U | 5/1982 |
| JP | H02255237 A | 10/1990 |

* cited by examiner

*Primary Examiner* — Kevin A Lathers
(74) *Attorney, Agent, or Firm* — Alleman Hall Creasman & Tuttle LLP

(57) ABSTRACT

An engine crank pulley structure disposed at a vehicle front side of a longitudinal engine includes: a front pulley that transmits crank rotational force to the water pump via a belt; a rear pulley that is disposed at a vehicle rear side of the front pulley and transmits a crank rotational force to a compressor via a belt; and a connecting portion that connects the front pulley and the rear pulley, the connecting portion crushing and deforming in a vehicle front-rear direction as a collision load toward the vehicle rear side is applied to it. An outer diameter of the front pulley is smaller than an inner diameter of the rear pulley.

4 Claims, 8 Drawing Sheets

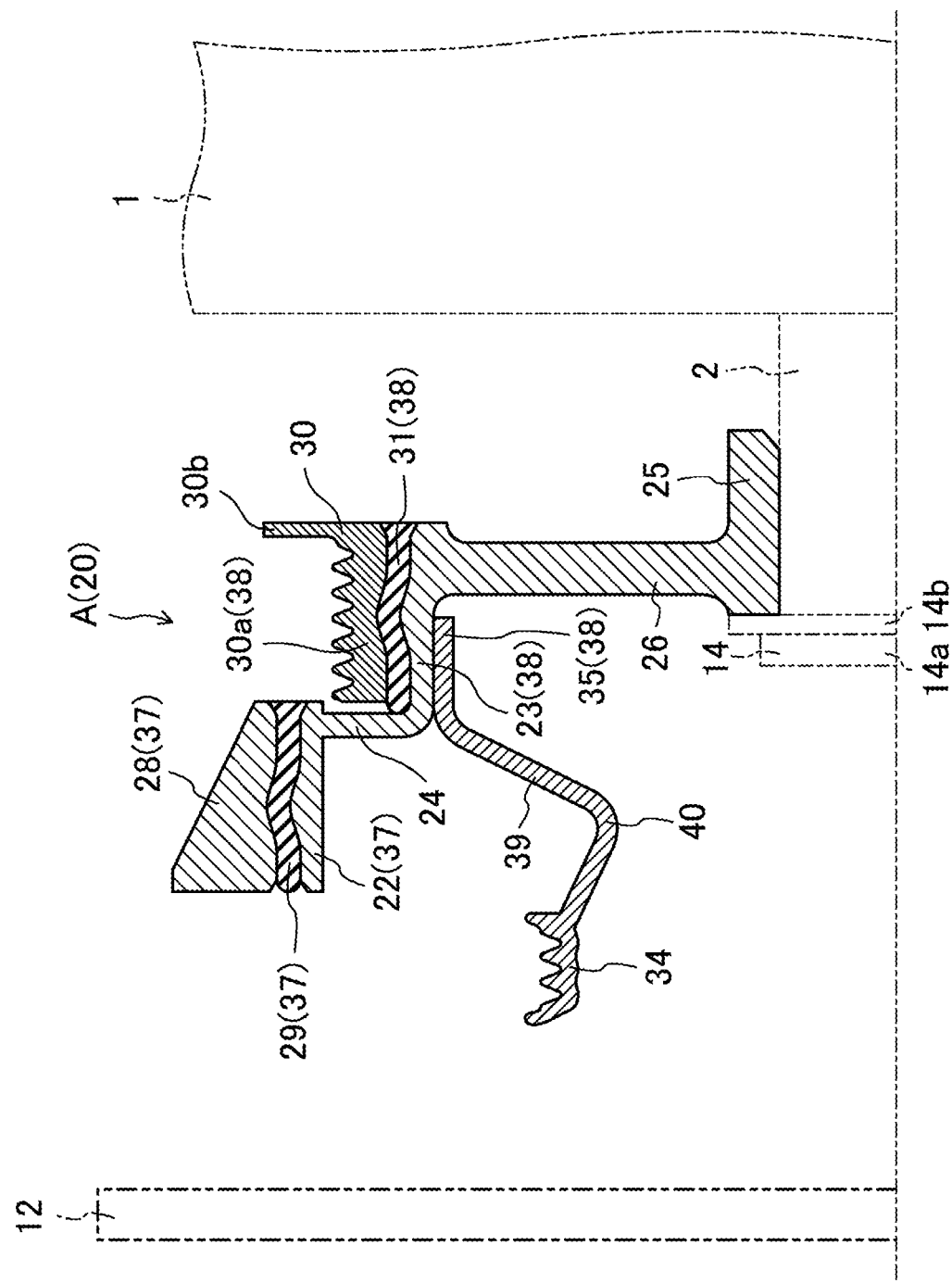

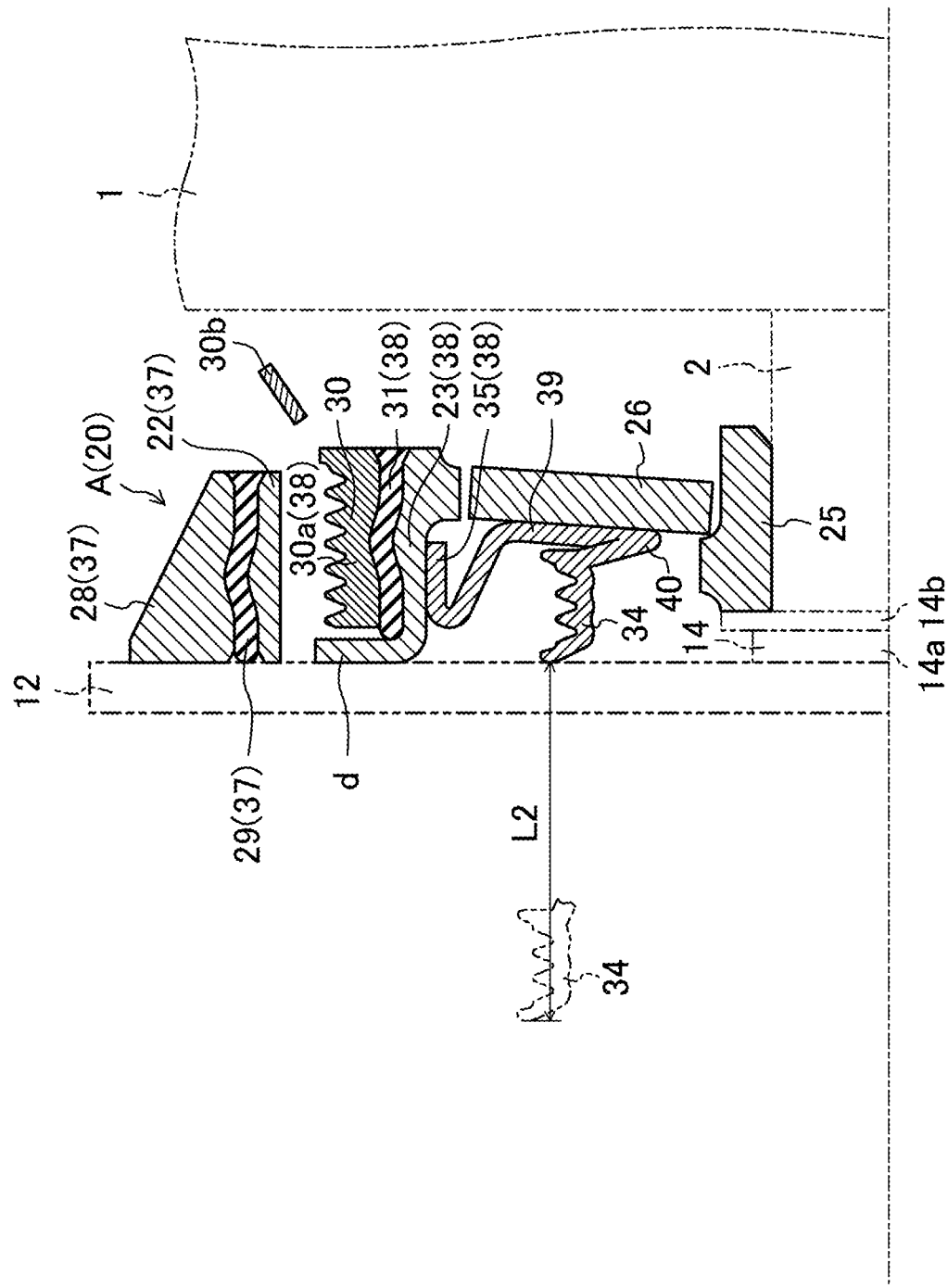

ENGINE CRANK PULLEY STRUCTURE

TECHNICAL FIELD

The present invention relates to an engine crank pulley structure.

BACKGROUND ART

A longitudinal engine has multiple cylinders arranged in a vehicle front-rear direction and is thus longer in the vehicle front-rear direction than transverse engines. That is, when the longitudinal engine is accommodated in an engine room located at a vehicle front side of a vehicle cabin, the engine room will often have a small space.

Also, the longitudinal engine includes a crank pulley disposed at the vehicle front side and a transmission disposed at a vehicle rear side.

In the event of a collision from the vehicle front side (hereinafter referred to as a "front-end collision"), a collision load toward the vehicle rear side is applied to the crank pulley, causing the crank pulley to push the engine toward the vehicle rear side. That is, this might cause a vehicle rear side end of the engine to contact a dash panel defining between the engine room and the vehicle cabin or cause the engine to intrude into the vehicle cabin. In order to prevent these occurrences, a crush space (crushing deformation amount) needs to be ensured to absorb the impact from the front-end collision.

For example, Patent Literature 1 discloses an invention of a crank pulley structure of an automobile engine. The crank pulley structure includes a fragile portion, such as a thin portion, that is provided in a crank pulley provided at a front end of an engine so as to protrude frontward. The fragile portion breaks under a load from a collision. The fragile portion is provided near an intermediate portion of the crank pulley between a front pulley portion and a rear pulley portion. In the event of a front-end collision, this configuration allows the fragile portion to break to thereby allow the front pulley portion to break and drop, which increases a crush stroke (crush space) in the amount corresponding to such breakage and dropping of the front pulley portion.

CITATION LIST

Patent Literature

Patent Literature 1: Japanese Patent Laid-Open No. 59-29175

SUMMARY OF INVENTION

Technical Problem

However, while the crank pulley disclosed in Patent Literature 1 breaks at its fragile portion in the event of a front-end collision, there is still a possibility that a sufficient crush space cannot be ensured as the front pulley portion pushed toward the vehicle rear side might contact the rear pulley portion.

The prevent invention has been made in view of such a point and primarily aims to ensure a sufficient crush space for front-end collisions in a crank pulley structure disposed at the vehicle front side of a longitudinal engine.

Solution to Problem

An engine crank pulley structure disclosed herein is an engine crank pulley structure disposed at a vehicle front side of a longitudinal engine, and the structure includes: a front pulley that transmits a crank rotational force to a first accessory via a belt; a rear pulley that is disposed at a vehicle rear side of the front pulley and transmits the crank rotational force to a second accessory via a belt; and a connecting portion that connects the front pulley and the rear pulley, the connecting portion crushing and deforming in a vehicle front-rear direction as a collision load toward the vehicle rear side is applied to the connecting portion, wherein an outer diameter of the front pulley is smaller than an inner diameter of the rear pulley.

With this configuration, the front pulley is pushed toward the vehicle rear side as a collision load toward the vehicle rear side is applied to the front pulley in the event of a front-end collision. The connecting portion then crushes and deforms in the vehicle front-rear direction as the collision load toward the vehicle rear side is applied to the connecting portion. This causes the front pulley to move toward the vehicle rear side. Here, the front pulley has an outer diameter smaller than an inner diameter of the rear pulley, and thus is accommodated inside the rear pulley as the front pulley moves toward the vehicle rear side. In other words, the front pulley can move toward the vehicle rear side to the position where the front pulley is accommodated inside the rear pulley.

This can ensure a sufficient crush space for front-end collisions in the crank pulley structure disposed at the vehicle front side of the longitudinal engine.

In one embodiment, the connecting portion has a V-shape protruding radially inward.

With this configuration, an apex of the V-shape in the connecting portion is positioned radially inward of the inner diameter of the rear pulley. This allows the connecting portion to be accommodated inside the rear pulley in the event of the front-end collision, so that the connecting portion hardly interferes with the rear pulley.

In one embodiment, the connecting portion includes a through-hole.

With this configuration, the connecting portion has low rigidity and is thus easy to crush and deform.

In one embodiment, the structure further includes an inertia ring between the front pulley and the rear pulley, and an inner diameter of the inertia ring is larger than an outer diameter of the rear pulley.

With this configuration, torsional vibrations of a crank shaft of the engine can be reduced. Also, a sufficient crush space can be ensured even with the presence of the inertia ring because, in the event of the front-end collision, the front pulley can move toward the vehicle rear side to the position where it is accommodated inside the inertia ring and the inertia ring can also move toward the vehicle rear side to the position where it accommodates therein the rear pulley.

In one embodiment, the inertia ring is connected to the rear pulley by a spoke or a perforated connecting plate portion that has a lower breaking strength than the inertia ring and the rear pulley.

With this configuration, the spoke or the perforated connecting plate portion fractures as the collision load toward the vehicle rear side is applied to it in the event of the front-end collision. This causes the inertia ring to move toward the vehicle rear side.

In one embodiment, the structure further includes a boss portion that extends toward the vehicle rear side relative to the rear pulley and fits on a crank shaft of the engine, and the rear pulley is connected to the boss portion by a spoke or a perforated connecting plate portion that has a lower breaking strength than the rear pulley and the boss portion, and inner diameters of the front pulley and the rear pulley are larger than an outer diameter of the boss portion.

With this configuration, the spoke or the perforated connecting plate portion fractures as the collision load toward the vehicle rear side is applied to it in the event of the front-end collision. Also, a sufficient crush space can be ensured because the front pulley and the rear pulley can move toward the vehicle rear side to the position where they accommodate therein the boss portion.

Advantageous Effect of Invention

The present invention can ensure a sufficient crush space for front-end collisions in a crank pulley structure disposed at the vehicle front side of a longitudinal engine.

BRIEF DESCRIPTION OF DRAWINGS

FIG. 5A illustrates how the engine crank pulley structure breaks during a front-end collision (illustrating the state before the front-end collision).

FIG. 5D illustrates how the engine crank pulley structure breaks during the front-end collision (mainly illustrating fracture of a connecting plate portion).

DESCRIPTION OF EMBODIMENT

Figure 2:
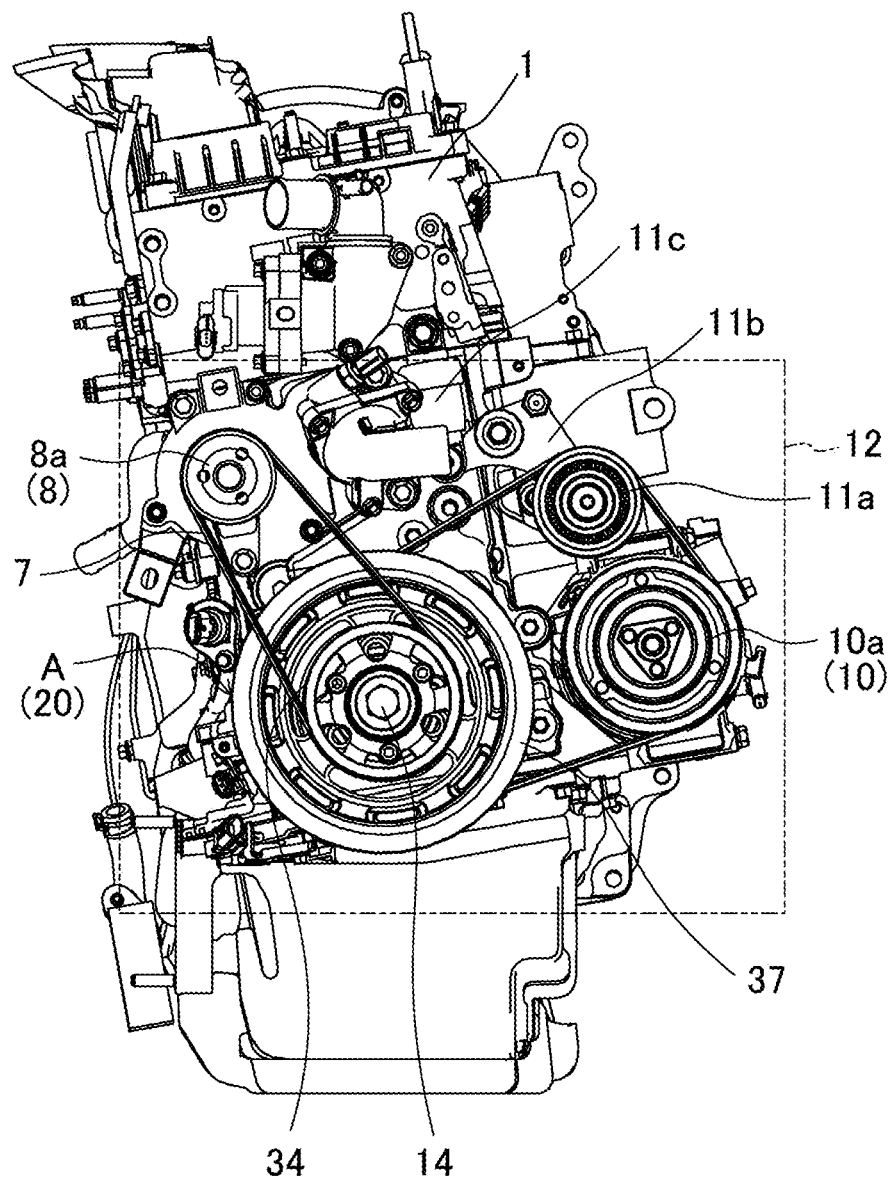
FIG. 2 is a front view of the engine crank pulley structure as viewed from the front side of the vehicle.
Figure 3:
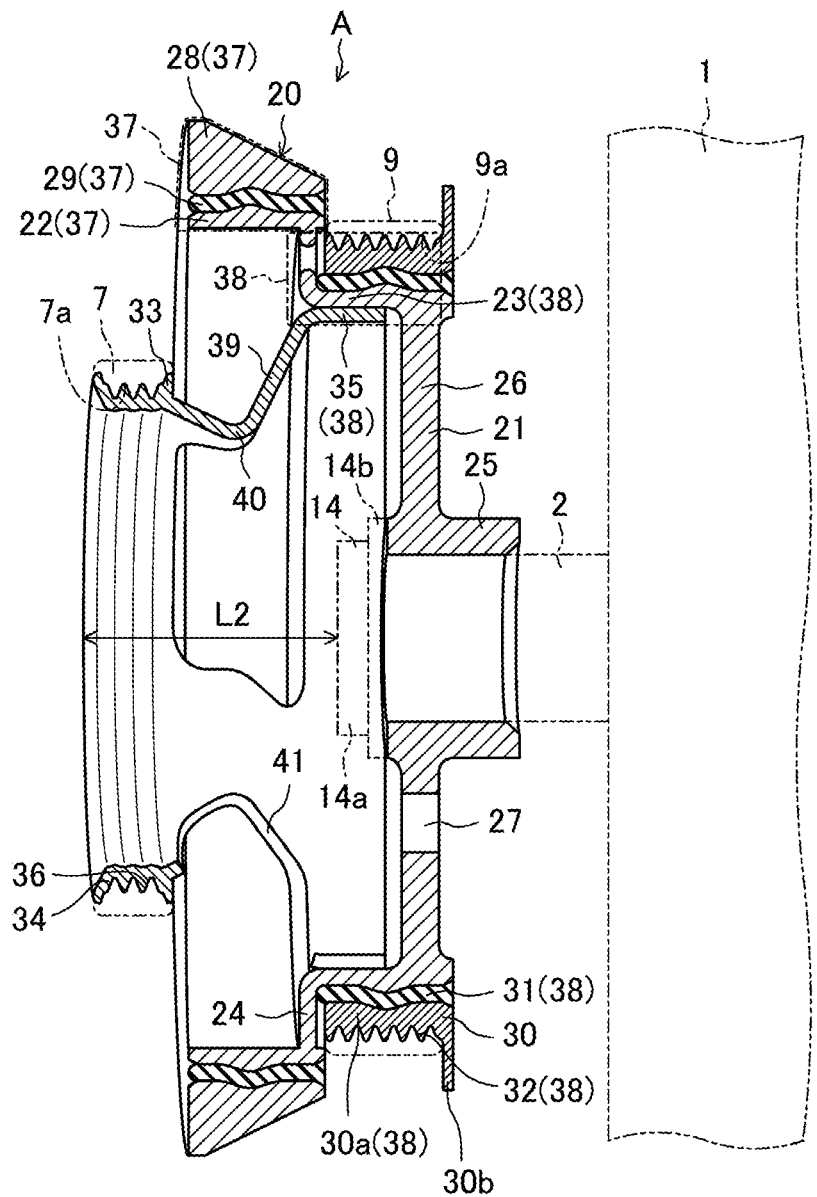
FIG. 3 is a vertical cross-sectional view of the engine crank pulley structure.
Figure 4:
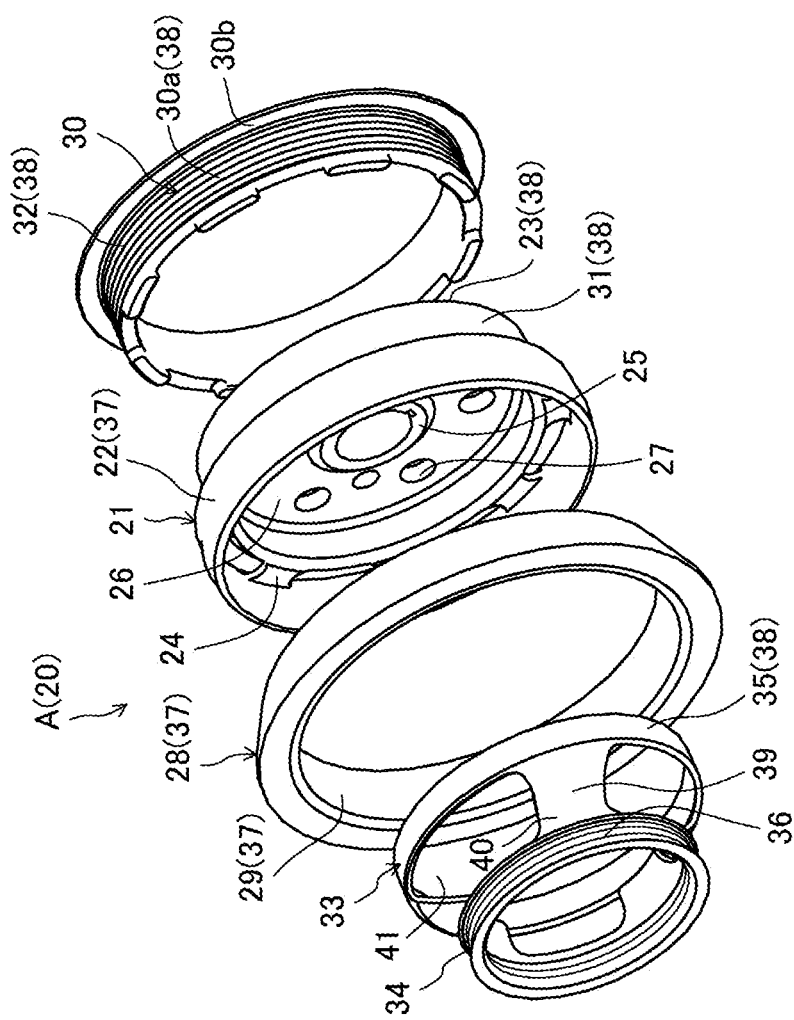
FIG. 4 is an exploded perspective view of the engine crank pulley structure.

Hereinafter, a detailed description will be given of an embodiment of the present invention with reference to drawings. The following description of a preferred embodiment is merely illustrative in nature and in no way intended to limit the present invention, its applications, or its uses. In the present description, a direction in which the vehicle moves forward and backward is referred to as a "front-rear direction," and the forward side in that direction is referred to as a "front side" while the backward side in that direction is referred to as a "rear side." A vehicle width direction is referred to as a "right-left direction," and the right side in that direction as viewed from the vehicle rear side is referred to as a "right side," while the left side in that direction as viewed from the vehicle rear side is referred to as a "left side." In FIGS. 1 and 2, an engine 1 and an engine crank pulley structure A are shown by solid lines, and the other components are shown by double-dotted dashed lines or otherwise omitted. In FIGS. 3 and 4, the engine crank pulley structure A is shown by solid lines, and the other components are shown by double-dotted dashed lines or otherwise omitted.

Figure 1:
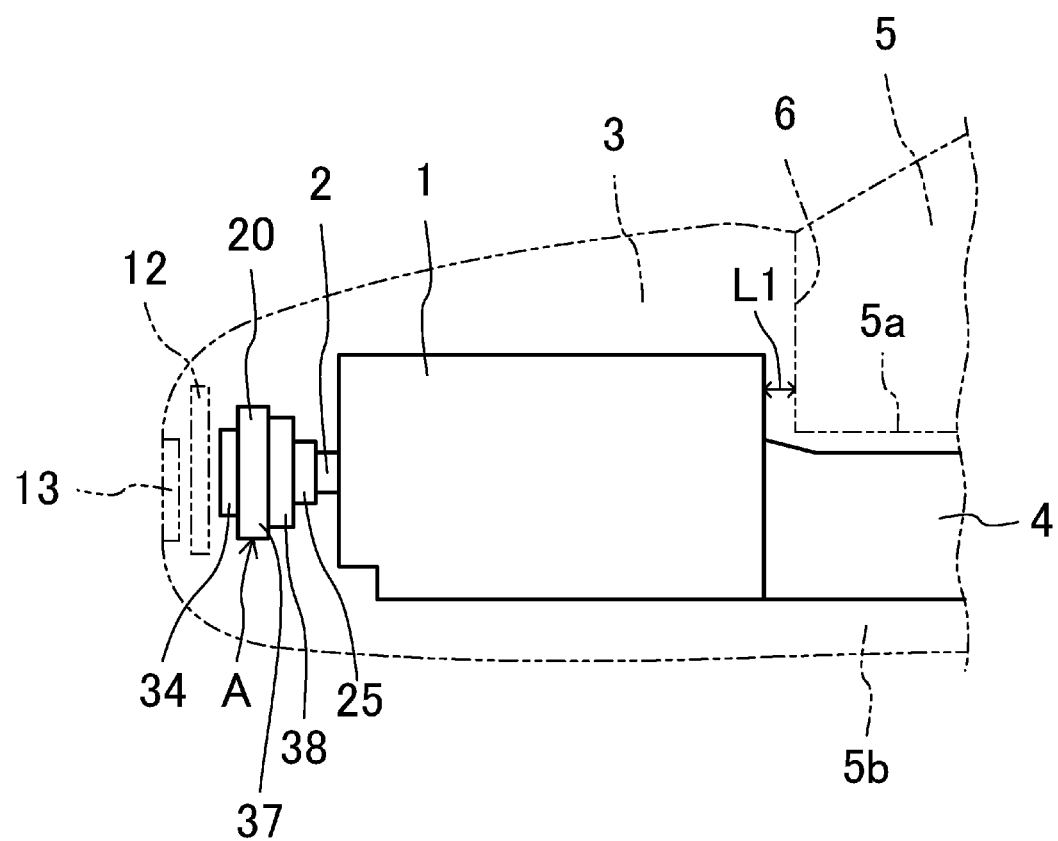
FIG. 1 is a schematic configuration diagram schematically illustrating an engine crank pulley structure according to an embodiment of the present invention, as viewed from the left side of the vehicle.

As shown in FIG. 1, the engine 1 is provided at the vehicle front side. The engine 1 is a longitudinal multicylinder engine having multiple cylinders arranged in the vehicle front-rear direction. A shaft direction of a crank shaft 2 coincides with the vehicle front-rear direction. The engine 1 is accommodated in an engine room 3 at the vehicle front side. A crank pulley 20 is disposed at the vehicle front side of the engine 1. On the other hand, a transmission 4 is disposed at the vehicle rear side of the engine 1. Further details of the crank pulley 20 will be described later. The transmission 4 is a gearbox having multiple gears and transmits motive power generated by the engine 1 to drive wheels (not shown). A vehicle cabin 5 for accommodating occupants is provided at the vehicle rear side of the engine room 3. A floor tunnel 5b protruding toward a vehicle upper side is formed at a vehicle-width-direction center portion of a floor 5a of the vehicle cabin 5, and the transmission 4 and an exhaust apparatus (not shown) are accommodated in the floor tunnel 5b. The engine room 3 and the vehicle cabin 5 are partitioned by a dash panel 6. A reference character L1 in FIG. 1 denotes a gap between a vehicle rear side end of the engine 1 and the dash panel 6. Since the engine 1 is a longitudinal engine, which is long in the vehicle front-rear direction, the gap L1 is often small as compared to when a transverse engine, which is long in the vehicle width direction and short in the vehicle front-rear direction.

As shown in FIG. 1, the crank pulley 20 is fixed to the crank shaft 2 and rotates therewith. While details will be given later, the crank pulley 20 is a two-step pulley composed of a larger pulley and a smaller pulley. The crank pulley 20 includes a front pulley 34 having a smaller diameter and disposed at the vehicle front side and a rear pulley 38 having a larger diameter and disposed at the vehicle rear side of the front pulley 34. It should be noted that the rear pulley 38 is not shown in FIG. 2 because the rear pulley 38 is hidden behind an inertia ring 37 (described later) and invisible from the vehicle front side. As shown in FIG. 2, the front pulley 34 transmits a crank rotational force transmitted from the crank shaft 2 to a water pump 8 (as a first accessory) via a belt 7. Specifically, a pulley 8a is fixed to a rotary shaft of the water pump 8 such that the pulley 8a can rotate therewith, and the belt 7 is wound around the front pulley 34 and the pulley 8a. Ribs 7a (see FIG. 3) are provided on an inner peripheral surface of the belt 7. Driving the water pump 8 causes a coolant to circulate inside the engine 1.

The rear pulley 38 transmits the crank rotational force transmitted from the crank shaft 2 to a compressor 10 (as a second accessory) for an air-conditioner via a belt 9. A pulley 10a is fixed to a rotary shaft of the compressor 10 such that the pulley 10a can rotate therewith. The belt 9 is wound around the rear pulley 38, the pulley 10a of the compressor 10, and a tensioner pulley 11a (described later). Ribs 9a (see FIG. 3) are provided on an inner peripheral surface of the belt 9. Driving the compressor 10 causes the air-conditioner to operate, whereby the temperature and humidity of the air inside the vehicle cabin 5 are conditioned. The tensioner pulley 11a is connected to a tensioner 11c via a tensioner arm 11b. The tensioner 11c suppresses fluctuations in slack-side tension of the belt 9. Fluctuations in tension of the belt 9 received by the tensioner pulley 11a is suppressed by the tensioner 11c via the tensioner arm 11b. While details will be given later, a crank pulley bolt 14 is used to fix the crank pulley 20 and the crank shaft 2.

As shown in FIGS. 1 and 2, a radiator 12 is disposed at the vehicle front side of the front pulley 34. The radiator 12 is an apparatus to cool the coolant that circulates inside the engine 1 due to the operation of the water pump 8. The coolant flowing inside the radiator 12 is cooled by vehicle traveling wind or the like. As shown in FIG. 1, a bumper reinforcement 13 is disposed at the vehicle front side of the radiator 12. The bumper reinforcement 13 is a collision resistant member fixed to a front end of the vehicle and absorbs impact from a front-end collision to thereby mitigate damages to occupants.

Now referring to FIGS. 3 and 4, the structure of the crank pulley 20 will be described in detail. As shown in FIG. 4, the crank pulley 20 is composed of four members, which are a base member 21, a first ring member 28, a second ring member 30, and a protruding member 33. Through details will be given later, the crank pulley 20 is assembled by fitting the first ring member 28, the second ring member 30, and the protruding member 33 onto the base member 21, as shown in FIG. 3. Each of these components of the crank pulley 20 will be detailed below.

As shown in FIGS. 3 and 4, the base member 21 includes a front ring portion 22 of a ring shape positioned at the vehicle front side, a rear ring portion 23 of a ring shape positioned at the vehicle rear side of the front ring portion 22, and a boss portion 25 of a cylindrical shape extending toward the vehicle rear side relative to the rear ring portion 23. An outer diameter of the rear ring portion 23 is smaller than an inner diameter of the front ring portion 22. A vehicle rear side end of the front ring portion 22 on an inner peripheral surface thereof and a vehicle front side end of the rear ring portion 23 on an outer peripheral surface thereof are connected to each other by a plurality of spokes 24, 24, . . . , 24 spaced apart from each other in a circumferential direction. The spokes 24 have a lower breaking strength than the front ring portion 22 and the rear ring portion 23.

As shown in FIGS. 3 and 4, an outer diameter of the boss portion 25 is smaller than inner diameters of the front ring portion 22 and the rear ring portion 23. A vehicle rear side end of the rear ring portion 23 on an inner peripheral surface thereof and a vehicle front side end of the boss portion 25 on an outer peripheral surface thereof are connected to each other by a connecting plate portion 26 of a plate shape along the entire circumference. The connecting plate portion 26 is provided with through-holes 27, 27, . . . , 27 and thus has a lower breaking strength than the rear ring portion 23 and the boss portion 25.

As shown in FIG. 3, an inner diameter of the boss portion 25 substantially matches an outer diameter of the crank shaft 2 (shown by double-dotted dashed lines in FIG. 3) of the engine 1, and the boss portion 25 fits on the crank shaft 2. As described above, the crank pulley 20 is fixed to the crank shaft 2 with the crank pulley bolt 14. As shown in FIG. 3, the crank pulley bolt 14 is composed of a head portion 14*a*, a flange portion 14*b*, and a threaded portion (not shown). An outer diameter of the flange portion 14*b* substantially matches an outer diameter of the boss portion 25. A threaded hole (not shown) is provided in a vehicle front side end of the crank shaft 2, and the threaded portion of the crank pulley bolt 14 is screwed into this threaded hole. At this time, the flange portion 14*b* abuts on the vehicle front side end of the boss portion 25, and the head portion 14*a* protrudes toward the vehicle front side relative to the boss portion 25, as shown in FIG. 3. A washer may intervene between the flange portion 14*b* and the boss portion 25.

As shown in FIG. 4, the first ring member 28 is a ring-shaped member and has a damper rubber 29 attached to its inner peripheral surface. An inner diameter of the first ring member 28 substantially matches an outer diameter of the front ring portion 22. As shown in FIG. 3, the first ring member 28 is fitted onto the front ring portion 22 of the base member 21 from the outside and is thereby fixed thereto via the damper rubber 29 such that the first ring member 28 can rotate with the front ring portion 22.

As shown in FIG. 4, the second ring member 30 is a ring-shaped member and includes an engaging portion 30*a* and a collar portion 30*b*. The engaging portion 30*a* constitutes portions of the second ring member 30 except its vehicle rear side end, and is provided with rib grooves 32 on an outer peripheral surface thereof. The rib grooves 32 engage the ribs 9*a* on the inner peripheral surface of the belt 9. The collar portion 30*b* constitutes the vehicle rear side end of the second ring member 30 and has an outer diameter larger than that of the engaging portion 30*a*. As shown in FIGS. 3 and 4, a damper rubber 31 is attached to the outer peripheral surface of the rear ring portion 23 of the base member 21. An inner diameter of the second ring member 30 substantially matches an outer diameter of the rear ring portion 23. As shown in FIG. 3, the second ring member 30 is fitted onto the rear ring portion 23 of the base member 21 from the outside and is thereby fixed thereto via the damper rubber 31 such that the second ring member 30 can rotate with the rear ring portion 23. At this time, as shown in FIG. 3, the inner diameter of the front ring portion 22 is larger than the outer diameter of the engaging portion 30*a* but smaller than the outer diameter of the collar portion 30*b*. The collar portion 30*b* may have a lower breaking strength than the engaging portion 30*a*.

As shown in FIG. 4, the protruding member 33 includes the front pulley 34 of a ring shape positioned at the vehicle front side, a fitting portion 35 of a ring shape positioned at the vehicle rear side of the front pulley 34, and a connecting portion 39 connecting the front pulley 34 and the fitting portion 35. Rib grooves 36 are provided on an outer peripheral surface of the front pulley 34. The rib grooves 36 engage the ribs 7*a* on the inner peripheral surface of the belt 7. An outer diameter of the front pulley 34 is smaller than an inner diameter of the fitting portion 35.

As shown in FIGS. 3 and 4, the connecting portion 39 connects a vehicle rear side end of the front pulley 34 on an inner peripheral surface thereof and a vehicle front side end of the fitting portion 35 on an inner peripheral surface thereof. Also, as shown in FIGS. 3 and 4, the connecting portion 39 has a "V-shape" protruding radially inward and includes a turned-back portion (apex) 40 located inward of the inner diameters of the front pulley 34 and the fitting portion 35. Also, the connecting portion 39 is not provided along the entire circumference without any gap between the front pulley 34 and the fitting portion 35. Specifically, as shown in FIG. 4, the connecting portion 39 is provided with a plurality of through-holes 41, 41, . . . , 41 spaced apart from each other in the circumferential direction. For example, the connecting portion 39 is formed of an easily deformable material such as a thin steel plate.

The connecting portion 39 crushes and deforms in the vehicle front-rear direction as a collision load equal to or higher than a predetermined value and going toward the vehicle rear side is applied to it. "Crush and deform in the vehicle front-rear direction" means that the dimension of the connecting portion 39 in the vehicle front-rear direction reduces. It should be noted that the connecting portion 39 should be designed such that it does not crush and deform under a small load, such as mere pushing toward the vehicle rear side, but crushes and deforms under a heavy load such as from a front-end collision. For this purpose, for example, the material and plate thickness of the connecting portion 39, the size, number, or arrangement of the through-holes 41, or other parameters may be adjusted as appropriate.

An outer diameter of the fitting portion 35 substantially matches the inner diameter of the rear ring portion 23. As shown in FIG. 3, the fitting portion 35 is fitted into the rear ring portion 23 of the base member 21 from the inside and thereby fixed thereto such that the fitting portion 35 can rotate therewith. As shown in FIG. 3, when the fitting portion 35 of the protruding member 33 is fitted in the rear ring portion 23 of the base member 21, the position of the vehicle rear side end of the fitting portion 35 substantially coincides with the position of the vehicle front side end of the boss portion 25 in the vehicle front-rear direction. Also, at this time, a vehicle front side end of the front pulley 34 is at the foremost position in the crank pulley 20. Also, the connecting portion 39 is accommodated inside the front ring portion 22. Note that the inner diameters of the front pulley 34 and the fitting portion 35 are larger than the outer diameter of the boss portion 25.

As shown in FIG. 3, the first ring member 28, the damper rubber 29, and the front ring portion 22 together compose the inertia ring 37 (portion enclosed by a double-dotted dashed line in FIG. 3). That is, an outer diameter of the inertia ring 37 substantially matches an outer diameter of the first ring member 28, and an inner diameter of the inertia ring 37 substantially matches the inner diameter of the front ring portion 22. Note that the inertia ring 37 is used for reducing torsional vibrations of the crank shaft 2.

Also, as shown in FIG. 3, the engaging portion 30a (including the rib grooves 32) of the second ring member 30, the damper rubber 31, the rear ring portion 23, and the fitting portion 35 together compose the rear pulley 38 (portion enclosed by a double-dotted dashed line in FIG. 3). That is, an outer diameter of the rear pulley 38 substantially matches the outer diameter of the engaging portion 30a, and an inner diameter of the rear pulley 38 substantially matches the inner diameter of the fitting portion 35.

To summarize the above, the crank pulley 20 includes the front pulley 34 and the rear pulley 38 disposed at the vehicle rear side of the front pulley 34. The connecting portion 39 connects the front pulley 34 and the rear pulley 38 (fitting portion 35). The outer diameter of the front pulley 34 is smaller than the inner diameter of the rear pulley 38 (fitting portion 35).

The inertia ring 37 (front ring portion 22) is provided between the front pulley 34 and the rear pulley 38 (rear ring portion 23) and accommodates therein the connecting portion 39. The inner diameter of the inertia ring 37 (front ring portion 22) is larger than the outer diameters of the front pulley 34 and the rear pulley 38 (engaging portion 30a) and smaller than the outer diameter of the collar portion 30b. The inertia ring 37 (front ring portion 22) is connected to the rear pulley 38 (rear ring portion 23) by the spokes 24, which have a lower breaking strength than the inertia ring 37 (front ring portion 22) and the rear pulley 38 (rear ring portion 23).

The boss portion 25 extends toward the vehicle rear side relative to the rear pulley 38 (rear ring portion 23). The rear pulley 38 (rear ring portion 23) is connected to the boss portion 25 by the connecting plate portion 26 perforated with the plurality of through-holes 27, 27, . . . , 27 and having a lower breaking strength than the rear pulley 38 (rear ring portion 23) and the boss portion 25. The inner diameters of the front pulley 34 and the rear pulley 38 (fitting portion 35) are larger than the outer diameter of the boss portion 25.

Reference is now made to FIGS. 5A-5D for a detailed description of how the crank pulley 20 breaks during a front-end collision.

As described above and as shown in FIG. 5A, the radiator 12 is disposed at the vehicle front side of the front pulley 34. Also, the vehicle front side end of the front pulley 34 is at the foremost position in the crank pulley 20. Thus, in the event of a front-end collision, the radiator 12 is pushed toward the vehicle rear side and first contacts the front pulley 34.

Figure 5B:
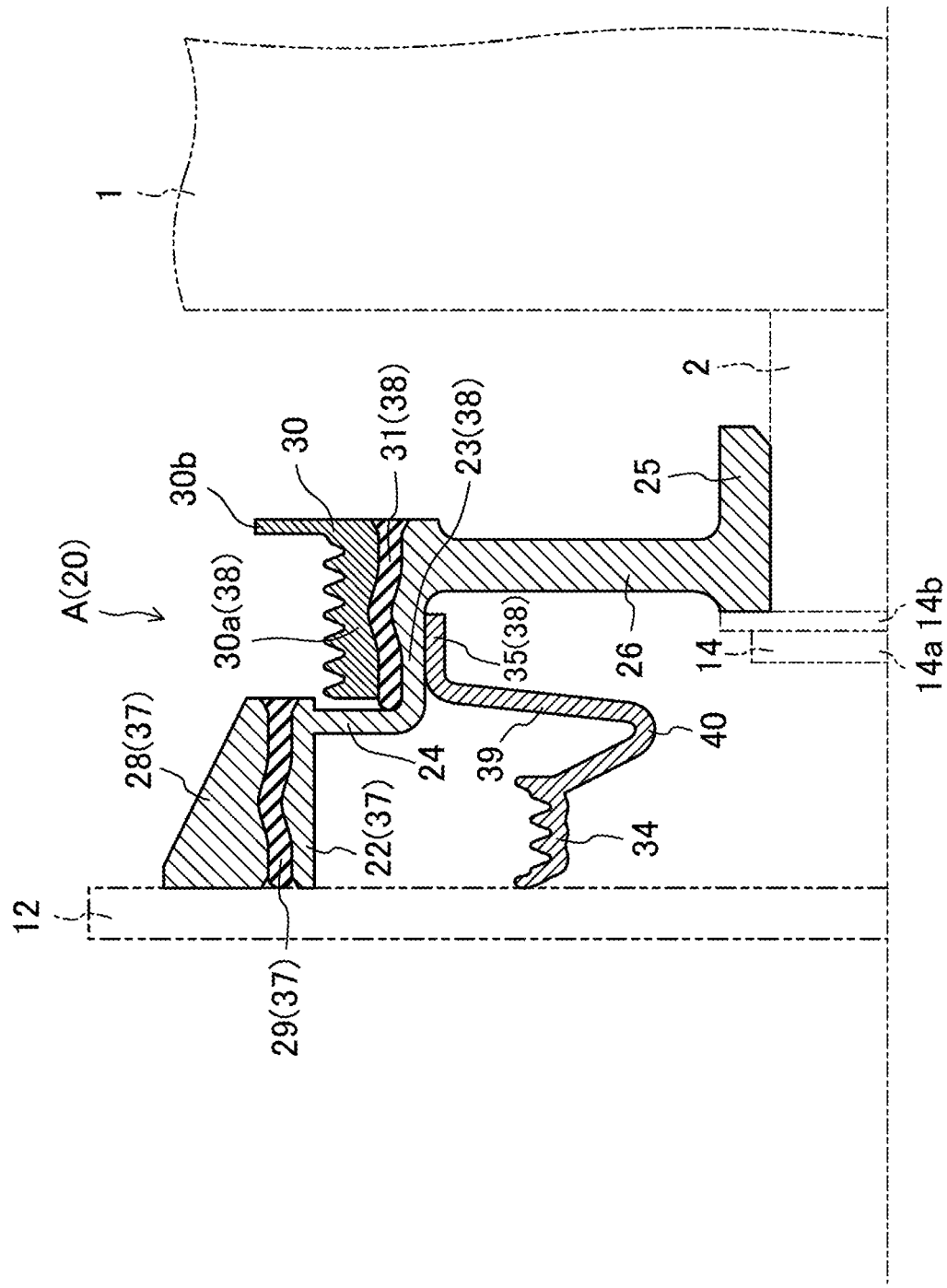
FIG. 5B illustrates how the engine crank pulley structure breaks during the front-end collision (mainly illustrating crushing deformation of a connecting portion).

After contacting the front pulley 34, the radiator 12 pushes it toward the vehicle rear side. Here, since the connecting portion 39 has the "V-shape" protruding radially inward, the connecting portion 39 crushes and deforms as a collision load toward the vehicle rear side is applied to it such that an angle of the V-shape becomes narrower, as shown in FIG. 5B. This causes the front pulley 34 to move toward the vehicle rear side. Here, the front pulley 34 has the outer diameter smaller than the inner diameter of the inertia ring 37 (front ring portion 22), and thus is accommodated inside the inertia ring 37 (front ring portion 22) as the front pulley 34 moves toward the vehicle rear side. The radiator 12 moves toward the vehicle rear side while pushing the front pulley 34 toward the vehicle rear side and contacts a vehicle front side end of the inertia ring 37.

Figure 5C:
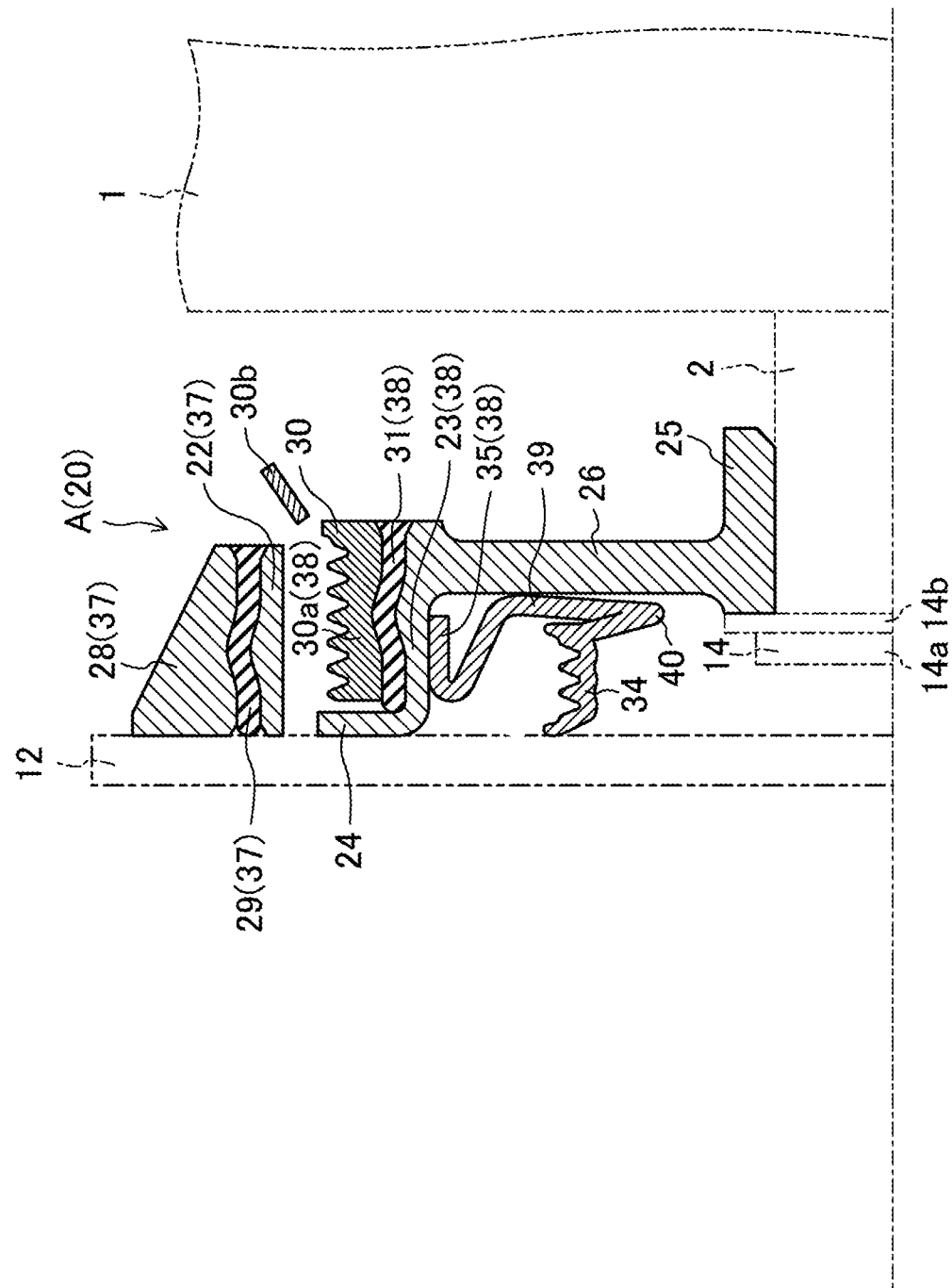
FIG. 5C illustrates how the engine crank pulley structure breaks during the front-end collision (mainly illustrating fracture of spokes).

As described above, the spokes 24 have the lower breaking strength than the inertia ring 37 (front ring portion 22) and the rear pulley 38 (rear ring portion 23) and are thus likely to fracture under the collision load toward the vehicle rear side. Hence, as shown in FIG. 5C, the spokes 24 fracture as the inertia ring 37 is pushed by the radiator 12 toward the vehicle rear side and thereby the collision load toward the vehicle rear side is applied to the spokes 24. Additionally, the connecting portion 39 crushes and deforms further in the vehicle front-rear direction as the front pulley 34 is pushed by the radiator 12 further toward the vehicle rear side and thereby the collision load toward the vehicle rear side is further applied to the connecting portion 39. This causes the front pulley 34 to move further toward the vehicle rear side along with the inertia ring 37. Here, the front pulley 34 has the outer diameter smaller than the inner diameter of the rear pulley 38 (fitting portion 35), and thus is accommodated inside the rear pulley 38 (fitting portion 35) as the front pulley 34 moves toward the vehicle rear side. Meanwhile, the inertia ring 37 (front ring portion 22) has the inner diameter larger than the outer diameter of the rear pulley 38 (engaging portion 30a), and thus accommodates therein the rear pulley 38 as the inertia ring 37 moves toward the vehicle rear side. The radiator 12 moves toward the vehicle rear side while pushing the front pulley 34 and the inertia ring 37 toward the vehicle rear side and contacts a vehicle front side end of the rear pulley 38.

At this time, as shown in FIG. 5C, the inertia ring 37 contacts the collar portion 30b. The collar portion 30b fractures as the collision load toward the vehicle rear side is applied to the collar portion 30b. Thus, the collar portion 30b does not hinder the inertia ring 37 from moving toward the vehicle rear side. Additionally, since the apex (turned-back portion) 40 of the V-shape in the connecting portion 39 is positioned radially inward of the inner diameter of the rear pulley 38 (fitting portion 35), the connecting portion 39 is accommodated inside the rear pulley 38 without interfering with it in the event of the front-end collision.

As described above, the connecting plate portion 26 perforated with the through-holes 27 has the lower breaking strength than the rear pulley 38 (rear ring portion 23) and the boss portion 25 and is thus likely to fracture upon application thereof to the collision load toward the vehicle rear side. Hence, as shown in FIG. 5D, the connecting plate portion 26 fractures as the rear pulley 38 is pushed by the radiator 12 toward the vehicle rear side and thereby the collision load toward the vehicle rear side is applied to the connecting plate portion 26. This causes the front pulley 34 to move further toward the vehicle rear side along with the inertia ring 37 and the rear pulley 38. Here, the front pulley 34, the inertia ring 37 (front ring portion 22), and the rear pulley 38 (fitting portion 35) have the inner diameters larger than the outer diameter of the boss portion 25 and thus accommodate therein the boss portion 25 as they move further toward the vehicle rear side.

In FIG. 5D, the position of the front pulley 34 before it is moved toward the vehicle rear side by the front end-collision (i.e., the position in FIG. 5A) is shown by a double-dotted dashed line. The connecting portion 39 (crank pulley 20) crushes and deforms in the vehicle front-rear direction by the front-end collision until, for example, the radiator 12 in contact with the front pulley 34 contacts the head portion 14a of the crank pulley bolt 14. Hence, in this case, a crush space (crushing deformation amount) L2 corresponds to a distance from the vehicle front side end of the front pulley 34 to a vehicle front side end of the head portion 14a of the crank pulley bolt 14 (see FIGS. 3 and 5D).

With the configuration as described above, the front pulley 34 is pushed toward the vehicle rear side as the collision load toward the vehicle rear side is applied to the front pulley 34 in the event of the front-end collision. The connecting portion 39 then crushes and deforms in the vehicle front-rear direction as the collision load toward the vehicle rear side is applied to the connecting portion 39. This causes the front pulley 34 to move toward the vehicle rear side. Here, the front pulley 34 has the outer diameter smaller than the inner diameter of the rear pulley 38 (fitting portion 35), and thus is accommodated inside the rear pulley 38 (fitting portion 35) as the front pulley 34 moves toward the vehicle rear side. In other words, the front pulley 34 can move toward the vehicle rear side at least to the position where the front pulley 34 is accommodated inside the rear pulley 38 (fitting portion 35).

This can ensure the sufficient crush space L2 for front-end collisions in the crank pulley structure A disposed in front of the longitudinal engine.

This enables the crank pulley 20, which is disposed at the vehicle front side of the engine 1, to sufficiently absorb the energy from a front-end collision, which in turn can reduce the movement of the engine 1 toward the vehicle rear side in the event of the front-end collision. In other words, the gap L1 (see FIG. 1) between the vehicle rear side end of the engine 1 and the dash panel 6 can be reduced. Thus, despite the employment of the longitudinal engine, which is long in the vehicle front-rear direction, as the engine 1, the spatial increase of the engine room 3 in the vehicle front-rear direction can be suppressed, which can reduce the size of the vehicle.

The apex (turned-back portion) 40 of the V-shape in the connecting portion 39 is positioned radially inward of the inner diameter of the rear pulley 38 (fitting portion 35). This allows the connecting portion 39 to be accommodated inside the rear pulley 38 in the event of the front-end collision, so that the connecting portion 39 hardly interferes with the rear pulley 38.

The connecting portion 39 provided with the through-holes 41 has low rigidity and is thus easy to crush and deform.

Providing the inertia ring 37 can reduce torsional vibrations of the crank shaft 2. Also, the sufficient crush space L2 can be ensured even with the presence of the inertia ring 37 because, in the event of the front-end collision, the front pulley 34 can move toward the vehicle rear side to the position where it is accommodated inside the inertia ring 37 (front ring portion 22) and the inertia ring 37 (front ring portion 22) can also move toward the vehicle rear side to the position where it accommodates therein the rear pulley 38.

The spokes 24 connecting the inertia ring 37 (front ring portion 22) and the rear pulley 38 (rear ring portion 23) fracture as the collision load toward the vehicle rear side is applied to them in the event of the front-end collision. This causes the inertia ring 37 to move toward the vehicle rear side.

The connecting plate portion 26 perforated with the through-holes 27 and connecting the rear pulley 38 (rear ring portion 23) and the boss portion 25 fractures as the collision load toward the vehicle rear side is applied to it in the event of the front-end collision. Also, the front pulley 34, the rear pulley 38 (rear ring portion 23), and the inertia ring 37 (front ring portion 22) having the inner diameters larger than the outer diameter of the boss portion 25 can move toward the vehicle rear side to the position where they accommodate therein the boss portion 25. As such, the sufficient crush space L2 can be ensured.

Additionally, the front pulley 34 having the smaller outer diameter is disposed at the distal end side (vehicle front side) where vibrations of the crank shaft 2 are relatively large, and this can reduce the amplitude of the crank pulley 20 caused by the vibrations of the crank shaft 2. Also, the front pulley 34 having the smaller diameter is connected to the water pump 8 as the first accessory via the belt 7 while the rear pulley 38 having the larger diameter is connected to the compressor 10 as the second accessory via the belt 9, and this allows an accessory requiring a small gear ratio and another accessory requiring a large gear ratio to be used separately as the first accessory and the second accessory, respectively.

Although the preferred embodiment of the present invention has been described above, the above description is not limiting and, of course, the embodiment may be modified in various ways.

While, in the present embodiment, the inertia ring 37 is provided between the front pulley 34 and the rear pulley 38, this is not limiting and the inertia ring 37 may be removed.

While the connecting portion 39 has the "V-shape" protruding radially inward, this is not limiting and, for example, the connecting portion 39 may have a "V-shape" protruding radially outward. In other words, the connecting portion 39 may have any shape that allows it to crush and deform in the vehicle front-rear direction as the collision load toward the vehicle rear side is applied to it.

While the connecting portion 39 directly connects the front pulley 34 and the rear pulley 38 (fitting portion 35), this is not limiting and the connecting portion 39 may indirectly connect them via another member.

The connecting portion 39 may fracture after crushing and deforming in the vehicle front-rear direction as the collision load toward the vehicle rear side is applied to it in the event of the front-end collision.

While the inertia ring 37 (front ring portion 22) and the rear pulley 38 (rear ring portion 23) are connected to each other by the spokes 24, and the rear pulley 38 (rear ring portion 23) and the boss portion 25 are connected to each other by the connecting plate portion 26 perforated with the through-holes 27, this is not limiting. For example, the inertia ring 37 (front ring portion 22) and the rear pulley 38 (rear ring portion 23) may be connected to each other by a perforated connecting plate portion, and the rear pulley 38

(rear ring portion 23) and the boss portion 25 may be connected to each other by spokes.

While the crank pulley bolt 14 is used to fix the crank pulley 20 and the crank shaft 2 such that they can rotate together, this is not limiting and any configuration may be adopted that can fix the crank pulley 20 and the crank shaft 2 such that they can rotate together.

While the crush space (crushing deformation amount) L2 is illustrated to correspond to the distance from the vehicle front side end of the front pulley 34 to the vehicle front side end of the head portion 14*a* of the crank pulley bolt 14, this is not limiting. For example, the crush space L2 may extend from the vehicle front side end of the front pulley 34 to the vehicle front side end of the boss portion 25.

While the water pump 8 is used as the first accessary and the compressor 10 is used as the second accessary, this is not limiting and any device may be used that allows the crank rotational force from the crank pulley 20 to be transmitted thereto via the belt 7 or 9. For example, a configuration may be adopted in which an alternator is mounted as the second accessory, and the alternator may be driven by the belt 9 wound around the alternator and the rear pulley 38.

While the front pulley 34 is pushed by the radiator 12 toward the vehicle rear side in the event of the front-end collision, this is not limiting and, for example, the front pulley 34 may be pushed by the bumper reinforcement 13 toward the vehicle rear side.

While the transmission 4 is accommodated in the floor tunnel 5*b*, this is not limiting and, for example, the transmission 4 may be accommodated in the engine room 3 along with the engine 1. In this case, the gap L1 would be a gap between the transmission 4 and the dash panel 6.

INDUSTRIAL APPLICABILITY

The present invention is applicable to engine crank pulley structures and is thus highly useful and enjoys wide industrial applicability.

REFERENCE CHARACTER LIST

A . . . Engine crank pulley structure
1 . . . Engine
2 . . . Crank shaft
7 . . . Belt
8 . . . Water pump (first accessory)
9 . . . Belt
10 . . . Compressor (second accessory)
20 . . . Crank pulley
24 . . . Spoke
25 . . . Boss portion
26 . . . Connecting plate portion
27 . . . Through-hole (hole)
34 . . . Front pulley
37 . . . Inertia ring
38 . . . Rear pulley
39 . . . Connecting portion
41 . . . Through-hole

The invention claimed is:

1. An engine crank pulley structure disposed at a vehicle front side of a longitudinal engine, the structure comprising:
a front pulley that transmits a crank rotational force to a first accessory via a belt;
a rear pulley that is disposed at a vehicle rear side of the front pulley and transmits the crank rotational force to a second accessory via a belt;
a connecting portion that connects the front pulley and the rear pulley, the connecting portion crushing and deforming in a vehicle front-rear direction as a collision load toward the vehicle rear side is applied to the connecting portion; and
an inertia ring between the front pulley and the rear pulley, wherein
an outer diameter of the front pulley is smaller than an inner diameter of the rear pulley,
the connecting portion has a V-shape protruding radially inward,
the connecting portion includes a through-hole, and
an inner diameter of the inertia ring is larger than an outer diameter of the rear pulley.

2. The engine crank pulley structure according to claim 1, wherein
the inertia ring is connected to the rear pulley by a spoke or a perforated connecting plate portion that has a lower breaking strength than the inertia ring and the rear pulley.

3. The engine crank pulley structure according to claim 2, further comprising a boss portion that extends toward the vehicle rear side relative to the rear pulley and fits on a crank shaft of the engine, wherein
the rear pulley is connected to the boss portion by a spoke or a perforated connecting plate portion that has a lower breaking strength than the rear pulley and the boss portion, and
an inner diameter of the front pulley and the inner diameter of the rear pulley are both larger than an outer diameter of the boss portion.

4. The engine crank pulley structure according to claim 1, further comprising a boss portion that extends toward the vehicle rear side relative to the rear pulley and fits on a crank shaft of the engine, wherein
the rear pulley is connected to the boss portion by a spoke or a perforated connecting plate portion that has a lower breaking strength than the rear pulley and the boss portion, and
an inner diameter of the front pulley and the inner diameter of the rear pulley are both larger than an outer diameter of the boss portion.

* * * * *